(12) United States Patent
Kim et al.

(10) Patent No.: US 7,195,191 B2
(45) Date of Patent: Mar. 27, 2007

(54) OIL SPATTERING PREVENTION APPARATUS FOR TAPE RECORDER

(75) Inventors: Bong-joo Kim, Suwon (KR); Hyeong-seok Choi, Suwon (KR); Jae-kab Seo, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 59 days.

(21) Appl. No.: 10/702,726

(22) Filed: Nov. 7, 2003

(65) Prior Publication Data
US 2004/0168856 A1 Sep. 2, 2004

(30) Foreign Application Priority Data
Dec. 30, 2002 (KR) .................. 10-2002-0086850
Feb. 5, 2003 (KR) .................. 10-2003-0007274

(51) Int. Cl.
*G11B 23/04* (2006.01)
(52) U.S. Cl. .................. 242/340; 242/349; 242/914; 384/372
(58) Field of Classification Search .............. 242/335, 242/354, 340, 914, 349; 384/279, 286, 291, 384/372
See application file for complete search history.

(56) References Cited
U.S. PATENT DOCUMENTS
6,361,215 B1 * 3/2002 Wilkes et al. .............. 384/117
2003/0190102 A1 * 10/2003 Horng et al. .............. 384/292

FOREIGN PATENT DOCUMENTS

| JP | 08-129802 | 5/1996 |
|---|---|---|
| JP | 10-080091 | 3/1998 |
| JP | 10-134452 | 5/1998 |
| JP | 10-222897 | 8/1998 |
| JP | 2595092 | 3/1999 |
| JP | 2002-181046 | 6/2002 |
| KR | 1998-0009477 | 4/1998 |

* cited by examiner

*Primary Examiner*—John Q. Nguyen
(74) *Attorney, Agent, or Firm*—Roylance, Abrams, Berdo & Goodman, LLP

(57) ABSTRACT

An oil spatter prevention apparatus having a shaft for use with a device, such as a tape recorder, including a stationary portion fixed to a deck, a shaft body extended from the stationary portion on which a rotation body is rotatably supported on an outer circumference, and an oil spattering prevention means for preventing oil applied between the shaft body and the rotation body from being spattered when the shaft body rotates, the oil spatter prevention means being at least one of a circumferential recess on the shaft body, an annular recess on the shaft stationary portion, and a recess exterior and adjacent to the shaft.

7 Claims, 6 Drawing Sheets

OIL SPATTERING PREVENTION APPARATUS FOR TAPE RECORDER

CROSS-REFERENCE TO RELATED APPLICATIONS

This application claims the benefit of Korean Patent Application No. 2002-86850 filed Dec. 30, 2002 and Korean Patent Application No. 2003-7274 filed Feb. 5, 2003 in the Korean Intellectual Property Office, the disclosures of which are incorporated herein by reference.

BACKGROUND OF THE INVENTION

1. Field of the Invention

The present invention relates to an oil spattering prevention apparatus for a tape recorder, and more specifically, to one or more channels or recesses disposed on a shaft body or shaft supporting holder in a device, such as a tape recorder, to capture and deflect excess oil present on moving parts.

2. Description of the Related Art

Conventional tape recorders are typically used for recording and reproducing information on a recording medium such as a magnetic tape. Such tape recorders are usually divided into categories such as video cassette tape recorders (VCR) and camcorders.

As shown in FIG. 1, a conventional tape recorder comprises a main deck 2 on which a head drum 1 is rotatably disposed, a sub deck 3 disposed on the main deck 2 to be loaded and unloaded, a reel apparatus 4 rotatably disposed on the sub deck 3 for driving a tape reel of a tape cassette, and a power transmission unit 6 for selectively transmitting power of a capstan motor assembly 5 provided on the main deck 2 to the reel apparatus 4.

The reel apparatus 4 is divided into a supply side reel assembly 4a for supplying a magnetic tape from the tape cassette, and a take-up side reel assembly 4b for winding the supplied magnetic tape. FIG. 2 shows an example of the reel assembly 4b, comprising a shaft 10 fixed to the sub deck 3, and a reel body 20 rotatably disposed on the shaft 10. The shaft 10 comprises a stationary portion 11 fixed on the sub deck 3, and a shaft body 13 having a reduced outside diameter extending from the stationary portion 11. The reel body 20 may take various forms as well-known to those skilled in the art.

The reel body 20 is rotatably supported by the shaft body 13. For smooth rotation of such a reel body 20, oil is applied between the shaft body 13 and the reel body 20. However, in the above structure, the oil running down on the shaft body 13 may be spattered during the high-speed rotation of the reel body 20. In doing so, the spattered oil contaminates the surrounding parts thereby causing malfunction of the parts. For example, if a sensing portion 21 provided at the lower part of the reel body 20 and a sensor 25 for detecting the sensing portion 21 are contaminated by the spattered oil, they may not be able to sense the normal operation of the reel assembly.

FIG. 3 shows an example of the capstan motor assembly 5 of FIG. 1. Referring to FIG. 3, the capstan motor assembly 5 comprises a motor frame 31 disposed at a predetermined distance above the main deck 2, a driving portion 33 disposed at a lower part of the motor frame 31, a rotatable shaft 35 upwardly protruding from the motor frame 31, and a holder 37 for rotatably supporting the shaft 35. The shaft 35 is contact-compressed by a pinch roller with a magnetic tape disposed therebetween. The shaft 35 guides the running magnetic tape in association with the pinch roller and is supported on the holder 37 by a metal bearing 38.

The capstan motor assembly 5 as described above also requires oil to be applied on the metal bearing 38 to reduce a load to the metal bearing 38. However, in case of an excessive oil application, the oil may run down on the shaft 35 and be spattered during the high-speed rotation of the shaft 35, contaminating an exterior of the holder 37. Moreover, the oil on the exterior of the holder 37 may also contaminate the magnetic tape contact-running around the shaft 35. For example, when a tension of the magnetic tape is reduced due to running stoppage or unstable position, the magnetic tape becomes loosened and thus can contact the holder 37. As a result, the magnetic tape can be contaminated by the oil present on the holder.

As described above, oil is required to be applied to a rotary body disposed on a deck of a tape recorder. However, a problem is created when the oil is transferred to the surrounding parts or is spattered by the rotation of the rotary body and thus contaminates the surrounding parts. Accordingly, a need exists for an apparatus to prevent oil on a rotary body in such applications from being spattered and contaminating surrounding parts.

SUMMARY OF THE INVENTION

An aspect of the invention is to solve at least the above problems and/or disadvantages and to provide at least the advantages described hereinafter.

Accordingly, one aspect of the present invention is to solve the foregoing problems by providing an oil spattering prevention apparatus for a device, such as a tape recorder, for preventing oil on a rotary body from being spattered and contaminating surrounding parts.

In order to accomplish the above aspects and/or other features of the present invention, a shaft apparatus is provided comprising a stationary portion fixed to a deck, and a shaft body extending from the stationary portion and having an outside diameter less than that of the stationary portion. The shaft body also includes a rotary body that is rotatably supported on an outer circumference, and an oil spattering prevention means for preventing oil applied between the shaft body and the rotary body from being spattered when the shaft body rotates.

The oil spattering prevention means comprises a circumferential recess having a predetermined depth formed on an outer circumference of the shaft body for receiving oil running down on the shaft body. The circumferential recess includes a first and second wall formed in a substantially perpendicular relation with respect to an axial direction of the shaft body and a third, or bottom wall, formed in a substantially parallel relation with respect to an axial direction of the shaft body.

The oil spattering prevention means comprises an annular recess formed on an upper surface of the stationary portion for receiving oil running down on the shaft body. The annular recess includes a first and second wall formed at an angle, wherein at least one wall is in a substantially parallel relation with respect to an axial direction of the shaft body.

The oil spattering prevention means further comprises an annular recess formed on an upper surface of the stationary portion for receiving oil running down on the shaft body.

The annular recess is formed on a boundary line between the shaft body and the stationary portion.

In accordance with an embodiment of the present invention, an oil spattering prevention apparatus is provided for a device, such as a tape recorder, comprising a shaft fixed to a sub deck which slides on a main deck, a reel assembly rotatably disposed on the shaft and having a tape reel of a tape cassette driven by the power of a capstan motor of the main deck seated thereon, and an oil spattering prevention means for preventing oil applied between the shaft body and the reel assembly from being spattered due to the rotation of the reel assembly.

The oil spattering prevention means comprises one or more recesses formed on an exterior of the shaft for receiving oil running down the shaft surface. The shaft comprises a stationary portion fixed on the sub deck, and a shaft body extending from the stationary portion and having an outside diameter less than that of the stationary portion, wherein the shaft body is provided for rotatably supporting the reel assembly. The oil spattering prevention means comprises at least one recess formed on the shaft body and/or the stationary portion.

The recess comprises a circumferential recess formed on an outer circumference of the shaft body in a circumferential direction, and/or an annular recess formed in a ring shape on an upper surface of the stationary portion. The circumferential recess is formed having a first and second wall in a substantially perpendicular relation with respect to an axial direction of the shaft body, and a third, or bottom wall, formed in a substantially parallel relation with respect to an axial direction of the shaft body. The annular recess is formed having a first and second wall formed at an angle, wherein at least one wall is in a substantially parallel relation with respect to an axial direction of the shaft body.

BRIEF DESCRIPTION OF THE DRAWINGS

The above objects and the features of the present invention will be more apparent by describing a preferred embodiment of the present invention with reference to the accompanying drawings, in which.

DETAILED DESCRIPTION OF THE PREFERRED EMBODIMENTS

Figure 1:
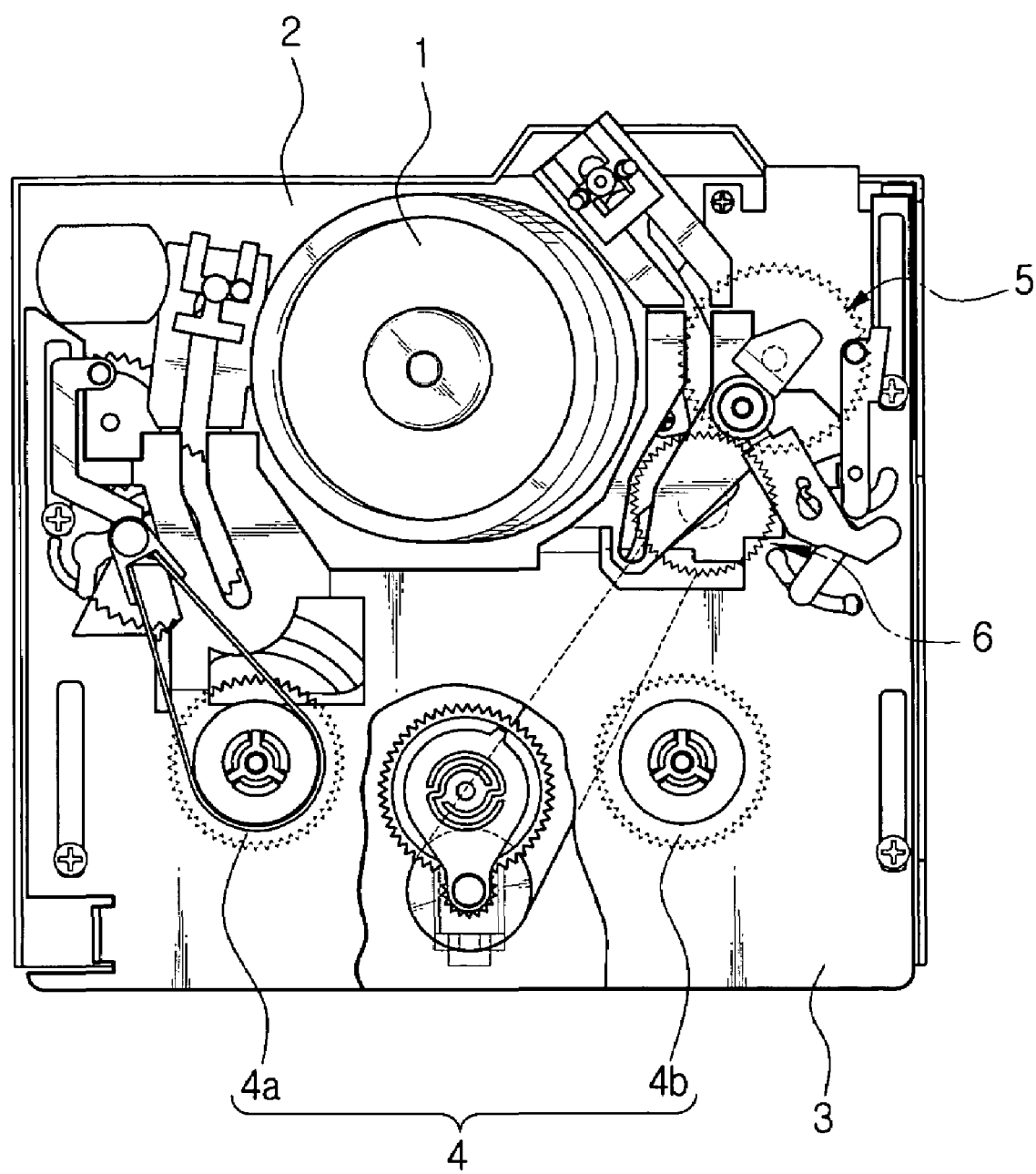
FIG. 1 is a plan view showing a moving deck of a conventional tape recorder.
Figure 2:
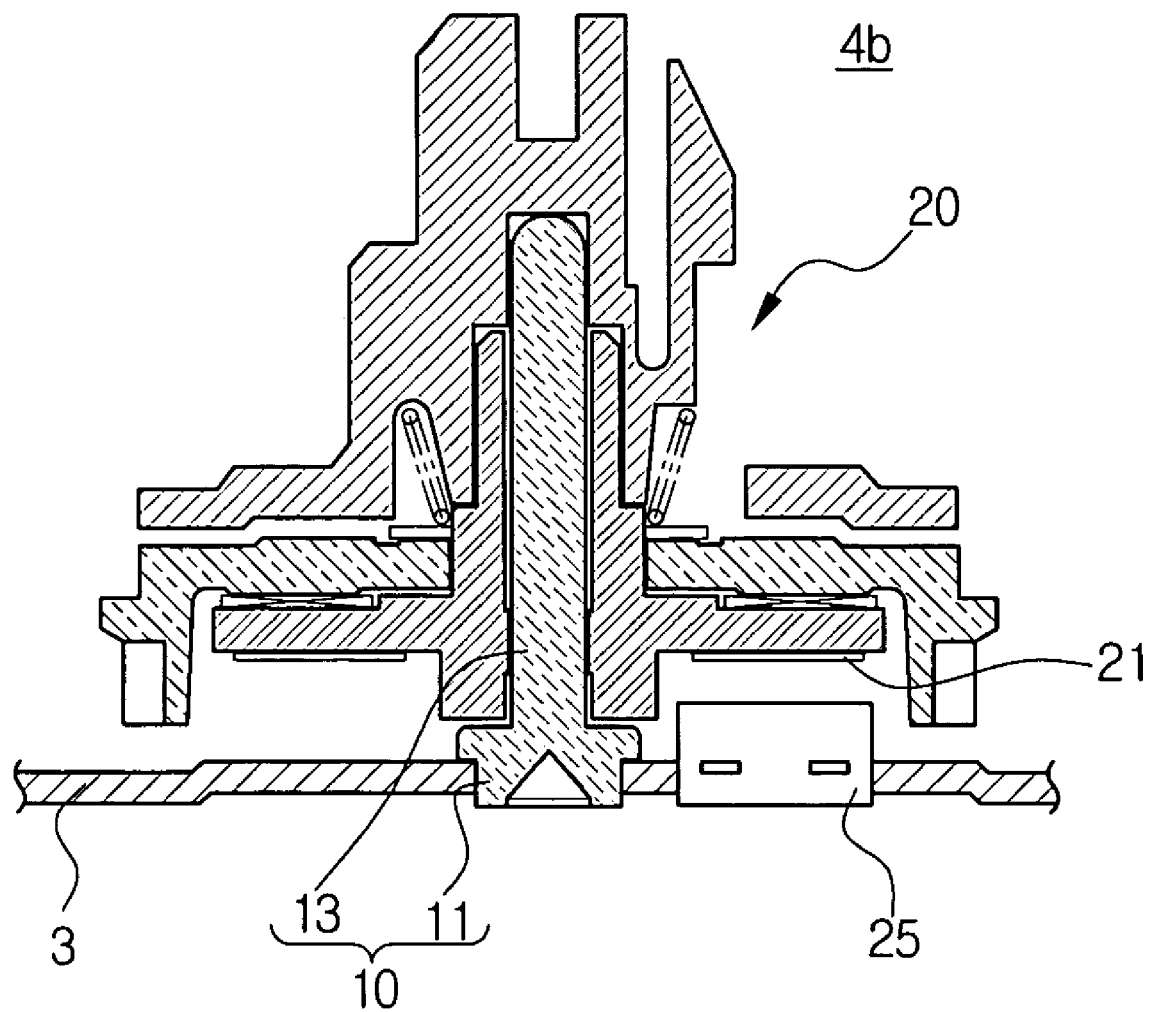
FIG. 2 is a sectional view showing the reel assembly of FIG. 1.

Hereinafter, a shaft assembly and a reel apparatus of a device, such as a tape recorder employing the same according to a preferred embodiment of the present invention, will be described in greater detail with reference to the accompanying drawings. With respect to the elements identical to those of the prior art, like reference numerals will be assigned.

Figure 4:
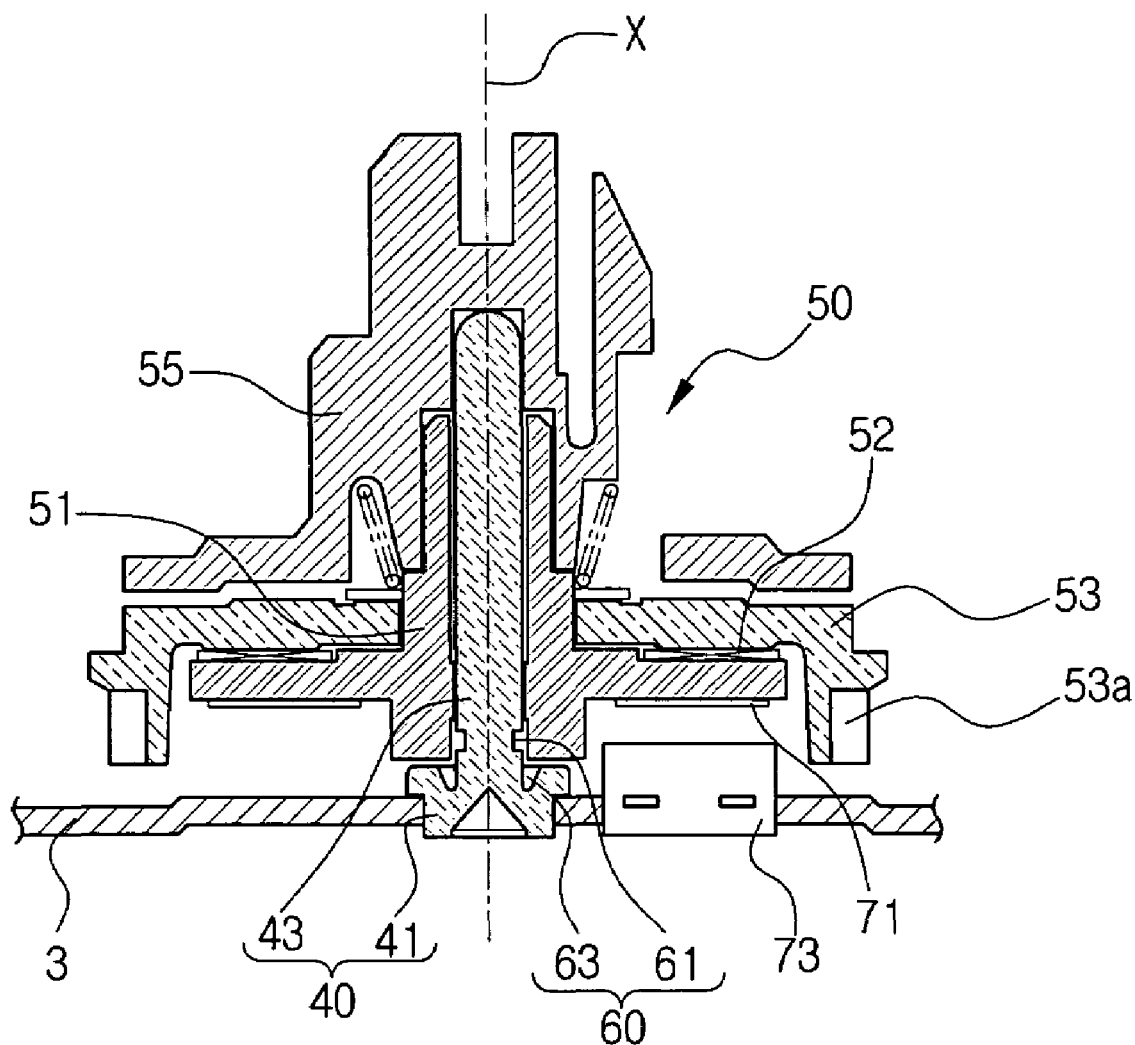
FIG. 4 is a sectional view showing an oil spattering prevention apparatus for a tape recorder according to one embodiment of the present invention.

Referring to FIG. 4, an oil spattering prevention apparatus for a tape recorder according to one embodiment of the present invention comprises a shaft 40 fixed to a sub deck 3, and having a reel assembly 50 rotatably disposed on the shaft 40, and an oil spattering prevention means 60.

The shaft 40 comprises a stationary portion 41 fixed in the sub deck 3, and a shaft body 43 extending from and integrally formed with the stationary portion 41. The stationary portion 41 is press-fit into the sub deck 3. The shaft body 43 is thinner than the stationary portion 41, that is, the shaft body 43 has an outer diameter smaller than that of the stationary portion 41. The reel assembly 50 is rotatably connected to the shaft body 43.

The reel assembly 50 comprises a lower reel 51 rotatably supported by the shaft body 43, a reel gear 53 supported by the lower gear 51 via a clutch 52 interposed therebetween, and an upper reel 55 connected to and rotating together with the lower reel 51.

For smooth rotation of the reel assembly 50, oil is applied between the shaft hollow of the lower reel 51 and the shaft body 43. The reel gear 53 rotates by the power transmitted from a capstan motor assembly 5 and has gear teeth 53a formed on the outer circumference. The clutch 52 between the reel gear 53 and the lower reel 51 is provided for reducing power of the reel gear 53 and transmitting the reduced power to the lower reel 51 and may be comprised of a plate spring or a friction member.

The upper reel 55 is fixed to the lower reel 51 and rotates together with the lower reel 51, and has a tape reel of the tape cassette seated thereon. Here, the lower reel 51 is provided with a sensing portion 71 such as a reflection member on the lower surface, and the sub deck 3 has a sensor 73 disposed thereon for detecting the sensing portion 71, thereby detecting rotation of the reel assembly 50.

In the embodiment of the present invention shown in FIG. 4, the oil spattering prevention means 60 is provided to prevent the oil applied between the shaft body 43 and the reel assembly 50 from being spattered when the reel assembly 50 rotates. Such oil spattering prevention means 60 comprises a circumferential recess 61 formed on the outer circumference of the shaft body 43 in a circumferential direction, and/or an annular recess 63 formed on an upper surface of the stationary portion 41. The circumferential recess 61 is formed on the lower end of the shaft body 43 in a circumferential direction. The circumferential recess 61 is recessed from the outer circumference of the shaft body 43 in a perpendicular relation with respect to the axial direction of the shaft body 43. Specifically, the circumferential recess includes a first and second wall formed in a substantially perpendicular relation with respect to an axial direction of the shaft body and a third, or bottom wall, formed in a substantially parallel relation with respect to an axial direction of the shaft body. The oil running down on the shaft body 43 therefore is received in the circumferential recess 61 and prevented from running down further and thereby being prevented from spattering outward.

The annular recess 63 is formed in a ring shape around the shaft body 43 on the upper surface of the stationary portion 41. Specifically, the annular recess includes a first and second wall formed at an angle, wherein at least one wall is in a substantially parallel relation with respect to an axial direction of the shaft body. Preferably, the annular recess 63 is formed on the boundary line where the stationary portion 41 and the shaft body 43 meet and effectively receives oil running down on the shaft body 43.

Accordingly, the oil running down on the shaft body 43 is firstly received by the circumferential recess 61 and prevented from running down the shaft body any further. Furthermore, the oil which is not received by the circumferential recess 61 is secondly received by the annular recess 63 and therefore the oil spattering by a rotation force of the reel assembly 50 can be effectively prevented. Moreover, by preventing the oil from being spattered, the surrounding parts can be prevented from being contaminated and, in particular, the sensing portion 71 and the sensor 73 can be prevented from being contaminated and therefore malfunctioning.

The embodiment of the present invention illustrated in FIG. 4 can be provided as a shaft body having a single circumferential recess 61, or as a shaft body having a plurality of circumferential recesses 61. Likewise, the shaft body can also be provided having a plurality of annular recesses 63.

The shaft and the oil spattering prevention apparatus employing the same according to an embodiment of the present invention described above can be used to effectively prevent oil present between the shaft and the reel assembly from running down and being spattered by the rotation of the reel assembly. Accordingly, the parts around the reel assembly can be prevented from being contaminated and therefore the product quality can be improved.

Figure 5:
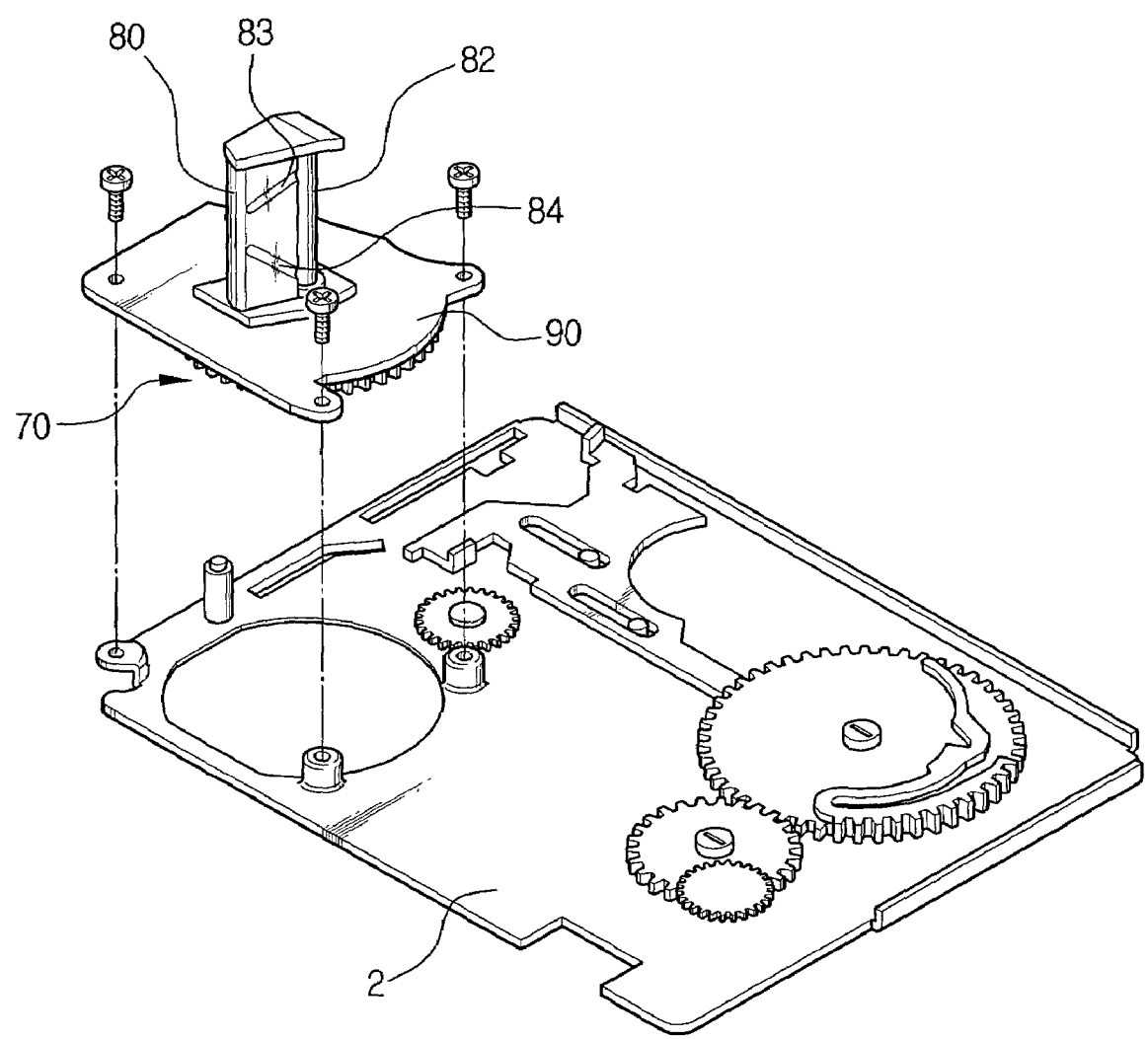
FIG. 5 is an exploded perspective view showing an oil spattering prevention apparatus for a tape recorder according to another embodiment of the present invention.
Figure 6:
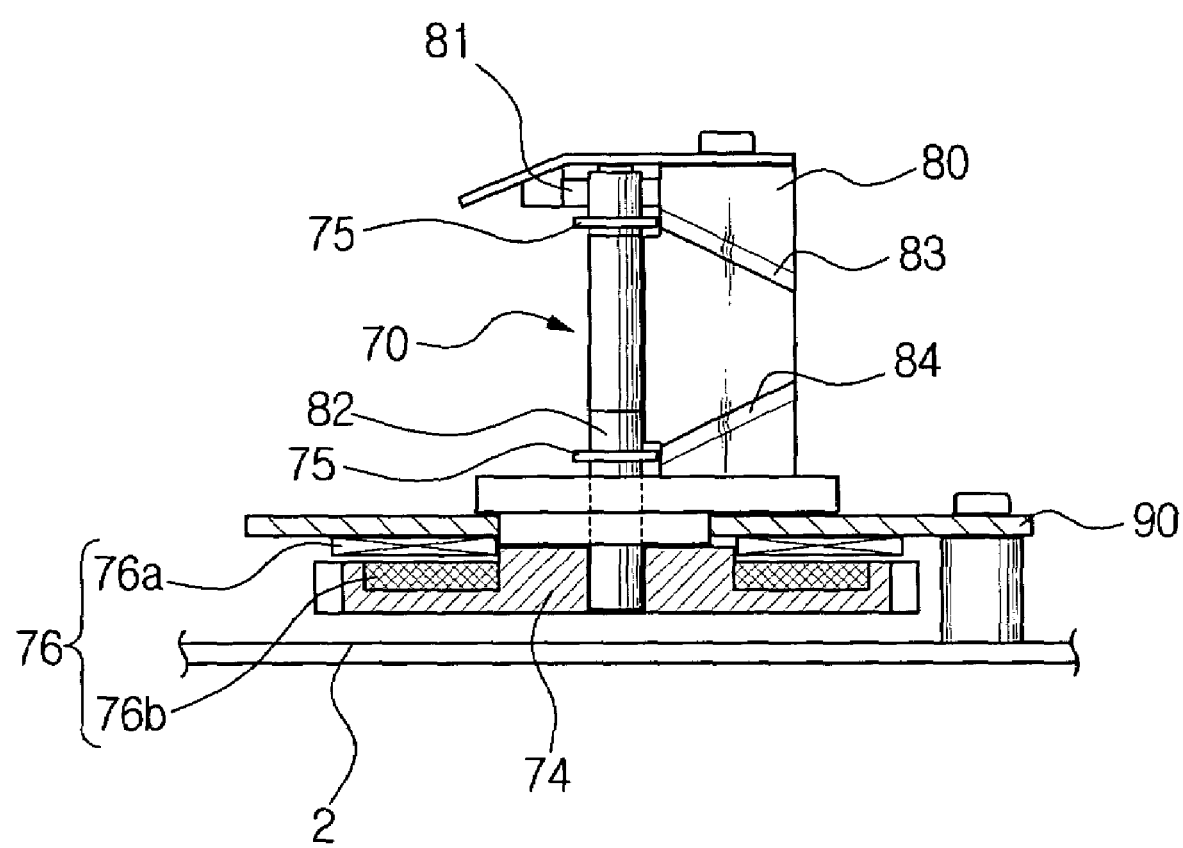
FIG. 6 is a partial sectional view showing the capstan motor assembly of FIG. 5.

Referring to FIGS. 5 and 6, an oil spattering prevention apparatus for a tape recorder according to another embodiment of the present invention comprises a capstan motor assembly 70 disposed on a main deck 2, a holder 80 disposed on an upper part of the main deck 2 to support a shaft 82 of the capstan motor assembly 70, and an oil guide portion provided in the holder 80.

Figure 3:
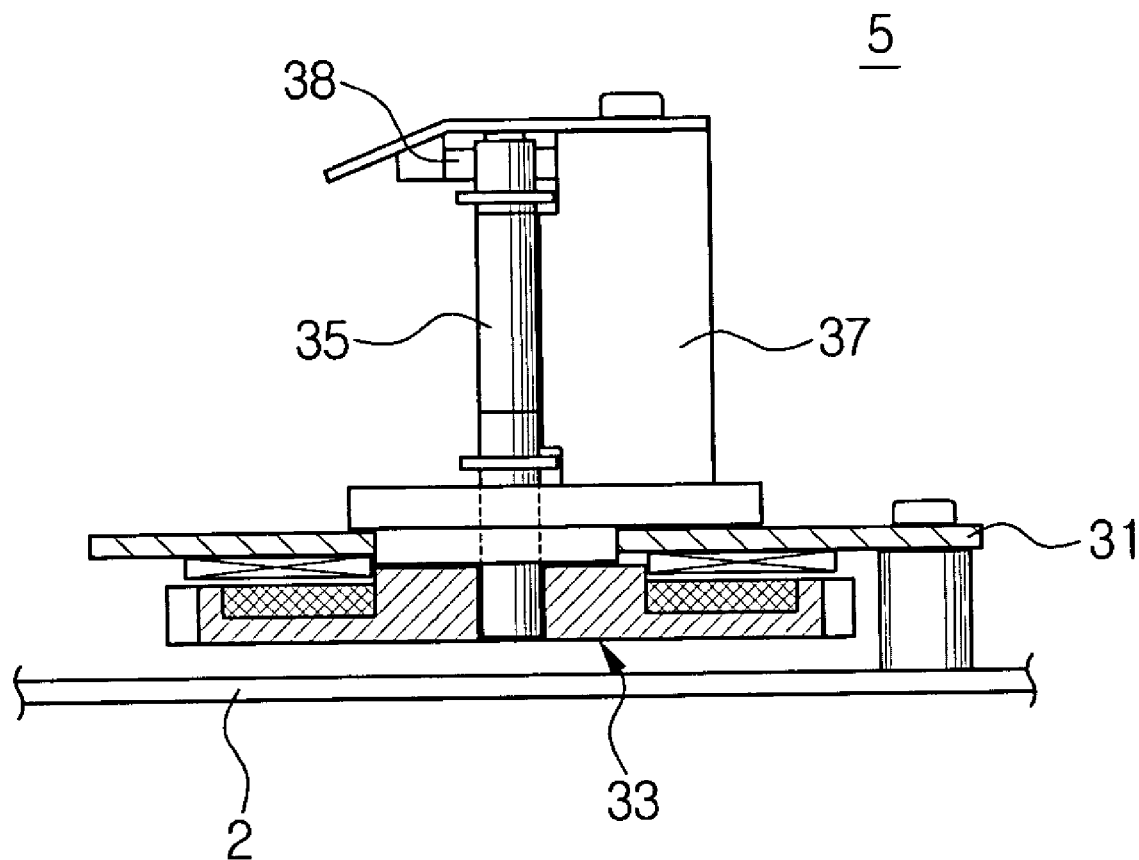
FIG. 3 is a partial sectional view showing the capstan motor assembly of FIG. 1.

The capstan motor assembly 70 comprises a shaft 82 uprightly disposed on a motor frame 90 which is disposed at a predetermined distance above the main deck 2, and a driving portion 76 for rotatably driving the shaft 82. The driving portion 76 has a stator 76a supported on a lower part of the motor frame 90 and a rotor 76b corresponding to the stator 76a. The rotor 76b is supported by a driving gear 74, which is rotatably disposed at a lower end of the shaft 82. The shaft 82 rotates at a high speed when driven by the driving portion 76, guiding the running of a magnetic tape. A pinch roller closely contacts the shaft 82 in the same way as disclosed in FIG. 3.

The holder 80 is disposed on the motor frame 90 to support the shaft 82. Particularly, the shaft 82 is rotatably supported by a metal bearing 81 between the shaft 82 and the holder 80. For smooth rotation, oil is applied to the metal bearing 81 as described above with reference to FIG. 3.

The shaft 82 is provided with flanges 75 respectively formed on an upper end and a lower end thereof, to prevent the transfer of the oil. The flanges 75 protrude from an outer circumference of the shaft 82 to prevent the oil from being transferred from the ends to the center portion of the shaft 82.

The holder 80 is provided with the oil guide portion in accordance with the embodiment of the present invention. The oil guide portion prevents the oil from running down on an outer surface of the holder 80 when excess oil applied to the shaft 82 is spattered from the flanges 75. The oil guide portion includes a first oil recess 83 and a second oil recess 84, which are formed in an exterior surface of the holder 80.

The first and the second oil recesses 83 and 84 are respectively formed in an upper part and a lower part of the holder 80 in a symmetrical manner. The first and the second oil recesses 83 and 84 each extend a predetermined length from a position where the holder 80 opposes the shaft 82, specifically at a point adjacent to each flange 75. Also, the first and the second oil recesses 83 and 84 are each inclined upwardly and downwardly, respectively, on the exterior of the holder 80, and terminate at a point near a rear edge of the exterior surface of the holder 80. The oil recesses 83 and 84 receive any oil spattered during the rotation of the shaft 82 and prevent the oil from running down and contaminating the outer surface of the holder 80. Accordingly, if the magnetic tape contacts the holder 80 either when running or when stopped, the magnetic tape is not contaminated by the oil.

The foregoing embodiments and advantages are merely exemplary and are not to be construed as limiting the present invention. The present teaching can be readily applied to other types of apparatus. The description of the present invention is intended to be illustrative and not serve to limit the scope of the claims. Many alternatives, modifications and variations will be apparent to those skilled in the art.

What is claimed is:

1. A shaft comprising:
    a stationary portion fixed to a deck;
    a shaft body extended in a diameter smaller than that of the stationary portion, the shaft body having at least one rotary body that is rotatably supported on an outer circumference of said shaft body; and
    an oil spattering prevention means disposed for preventing oil applied between the shaft body and the rotary body from being spattered when the rotary body rotates, wherein the oil spattering prevention means comprises:
        a circumferential recess formed on the outer circumference of the shaft body and having a predetermined depth and at least one side perpendicular to a substantially flat bottom surface at the predetermined depth for receiving oil running down on the shaft body; and
        an annular recess formed below a bottom surface of the rotating body and on an upper surface of the stationary portion and comprising at least one side parallel to a surface of the shaft body for receiving oil running down on the shaft body.

2. The shaft according to claim 1, wherein the annular recess is formed on a boundary between the shaft body and the stationary portion.

3. The shaft according to claim 1, wherein the circumferential recess is formed in a perpendicular relation with respect to an axial direction of the shaft body.

4. An oil spattering prevention apparatus for a tape recorder, comprising:
    a shaft fixed to a sub deck, wherein the sub deck slides on a main deck;
    a reel assembly rotatably disposed on a body of the shaft and having a tape reel of a tape cassette, wherein said tape reel is driven by a capstan motor of the main deck; and
    an oil spattering prevention means disposed for preventing oil applied between the shaft body and the reel assembly from being spattered due to rotation of the reel assembly, wherein the oil spattering prevention means comprises one or more recesses formed on an exterior of the shaft for receiving oil running down on the shaft and wherein the shaft comprises:
        a stationary portion fixed on the sub deck; and
        the shaft body being extended from the stationary portion and having a diameter smaller than that of the stationary portion, and rotatably supporting the reel assembly, wherein the oil spattering prevention means comprises a recess formed on at least one of the shaft body and the stationary portion, wherein the recess comprises a circumferential recess formed on an outer circumference of the shaft body and having a predetermined depth and at least one side perpendicular to a substantially flat bottom surface at the predetermined depth, and an annular recess formed in a ring shape below a bottom surface of the rotating body and on an upper surface of the stationary portion and comprising at least one side parallel to a surface of the shaft body.

5. The oil spattering prevention apparatus according to claim 4, wherein the circumferential recess is formed in a perpendicular relation with respect to an axial direction of the shaft body.

6. The oil spattering prevention apparatus according to claim 4, wherein the circumferential recess is comprised of a first and second wall formed in a substantially perpendicular relation with respect to an axial direction of the shaft body and a third wall formed in a substantially parallel relation with respect to the axial direction of the shaft body.

7. The oil spattering prevention apparatus according to claim 4, wherein the annular recess is comprised of a first and second wall formed at an angle, wherein at least one wall is in a substantially parallel relation with respect to an axial direction of the shaft body.

* * * * *